C. A. SMITH.
AUTOMOBILE STARTER.
APPLICATION FILED JULY 14, 1908.

951,707.

Patented Mar. 8, 1910.
2 SHEETS—SHEET 1.

Witnesses
F. L. Ourand
Wm. R. Andrews

Inventor
Charles Alvah Smith
By John A. Saul.
Attorney

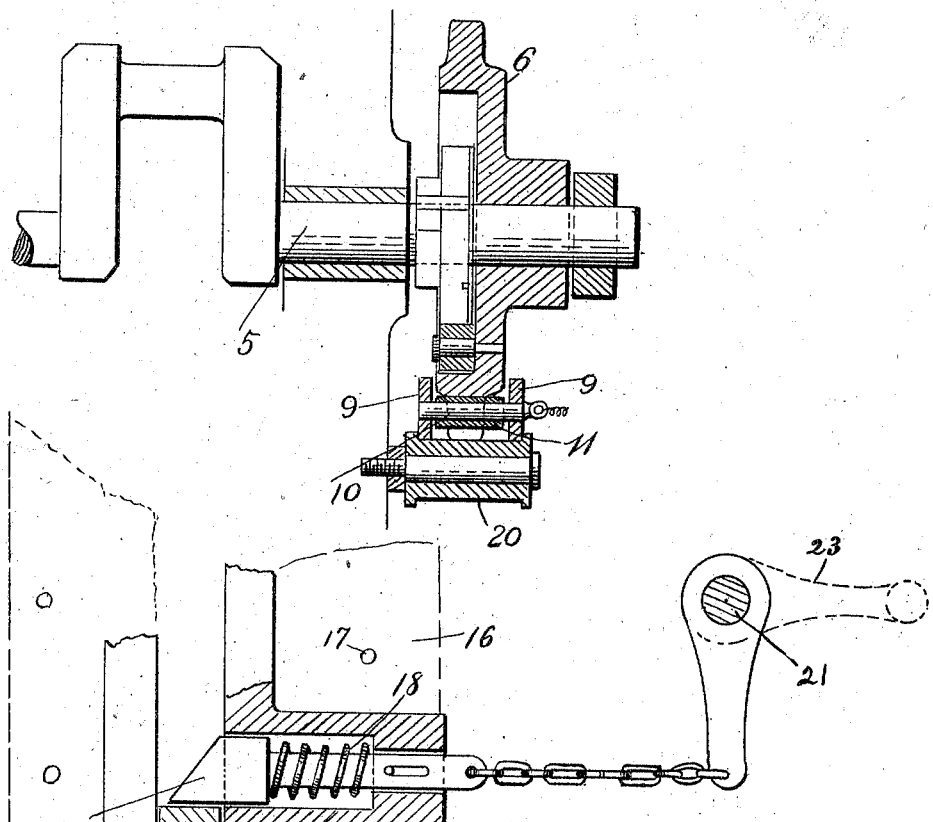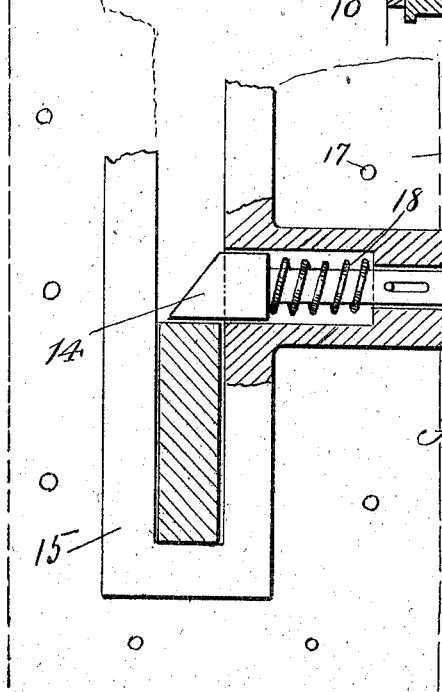

UNITED STATES PATENT OFFICE.

CHARLES ALVAH SMITH, OF BRATTLEBORO, VERMONT.

AUTOMOBILE-STARTER.

951,707.  Specification of Letters Patent.  Patented Mar. 8, 1910.

Application filed July 14, 1908. Serial No. 443,517.

*To all whom it may concern:*

Be it known that I, CHARLES ALVAH SMITH, a citizen of the United States, residing at Brattleboro, in the county of Windham and State of Vermont, have invented certain new and useful Improvements in Automobile-Starters, of which the following is a specification.

My invention relates to starting devices for automobiles, by means of which the regular starting crank, as commonly used, may be dispensed with, and the device may be operated by the driver without leaving his seat.

A further object is to enable the pedal to be locked in position by a latch, which latch can be released only by retarding the spark lever to the proper point for cranking the engine.

Figure 1:
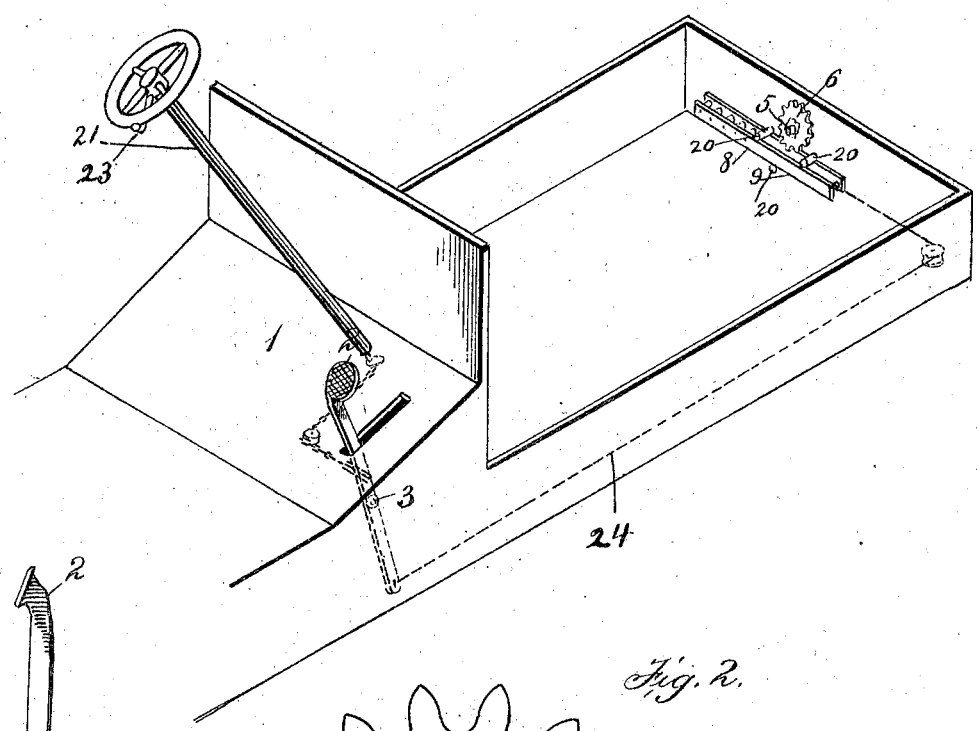
Figure 2:
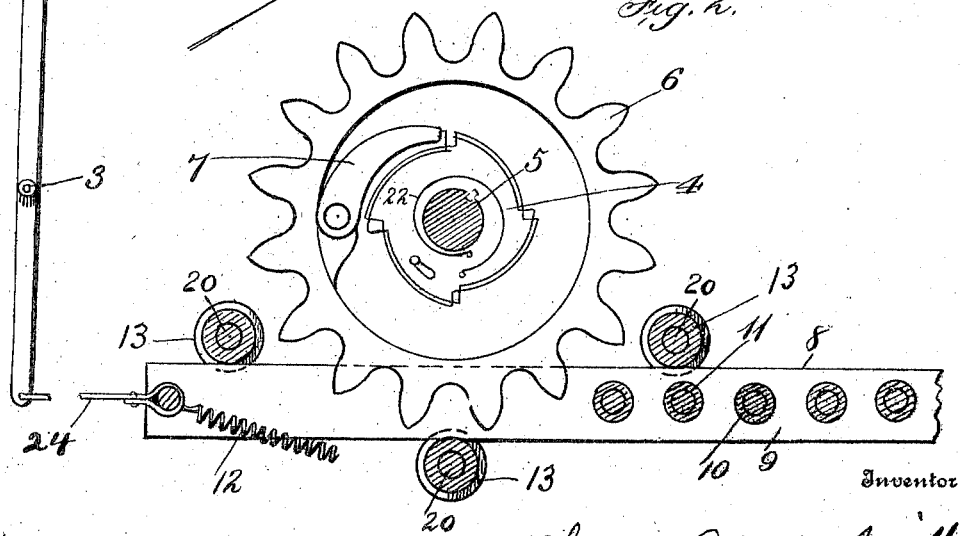

In the drawings forming a part of this specification, and in which like symbols of reference represent corresponding parts in the several views:—Figure 1 is a perspective view of the device, with some of the parts removed, showing it applied to an automobile; Fig. 2 is a longitudinal sectional view of the sprocket-wheel and rack; Fig. 3 is a transverse section of Fig. 2; and, Fig. 4 is a sectional bottom plan of the latch for locking the pedal.

1 represents the foot-board of the automobile; 2 the pedal; and 3 the fulcrum of the pedal.

4 is the ratchet, rigidly mounted on the shaft 5; 6 the sprocket-wheel loosely mounted on the shaft 5; and 7 a pawl on the sprocket that engages the ratchet 4 when the sprocket is revolved in a forward direction. The ratchet is preferably constructed, as shown, of two sections, one of which is loosely mounted upon the other and held by a suitable spring 22 in a position in which the teeth of the loose section do not exactly coincide with the teeth of the rigid section. This construction is not absolutely necessary, but is desirable. The sprocket-wheel 6 is milled to fit a roller rack 8, and has the teeth extending to a point, as shown. The rack 8, which imparts motion to the sprocket 6, is formed of two bars of metal 9, 9, held in position by studs 10, which studs also carry the rollers 11. These studs and rollers are in one end of the rack only, and for two reasons; first, if when the device was being operated, the charge in the cylinder should be prematurely ignited, causing the engine to revolve backward, the rack would be forced back to the point where the teeth are left out, thus disengaging itself from the sprocket, and preventing injury to the device; and, second, when the rack is returned by the spring 12, after operation, the sprocket is disengaged from the rack and revolves with the engine free from all contact with the rack. The rack is held in position to mesh with the sprocket 6 by rollers 13, which rollers are mounted on studs 20, which screw into the end of the crank case or other suitable support.

14 is a latch to lock the pedal, the same being merely a safeguard to prevent the operator from attempting to use the pedal when the spark-lever is in an advanced position. The fulcrum of the pedal is at a point below the latch, and in the same casting 15 with the latch. The casting has a flange 16 around it at the top edge and through the same screws are inserted through the screw-holes 17, to hold the same to the foot-board. This rim or flange is on top of the foot-board, and the part that carries the latch, etc., projects below the foot-board. The latch is made, as shown, with a coil spring 18 to push it into the slot in which the pedal moves.

On the underside of the foot-board is shown the shaft or rod on which the spark lever is mounted, and on this rod is mounted a crank, as shown, and said crank is connected to the latch in such a manner that the latch is released when the spark is retarded. The connection between the latch and the crank must be of such a construction that it will transmit motion in one direction only,—that is, as on the drawings, I show a chain 18, which will pull but cannot be pushed.

21 is the spark lever shaft. The shaft on which the spark lever and crank are mounted follows the column down through the foot-board; the spark lever being on the top end of this shaft, and the crank that withdraws the latch being located immediately under the foot-board.

23 is the spark lever.

24 is a cable, or the like, connecting the rack and pedal. If the engine is mounted crosswise of the chassis a rod, or the like, would be sufficient to make a connection.

The function of the second section of the ratchet is to assist in engaging the rack with the teeth on the sprocket-wheel. For example, if, when the rack approaches the sprocket, the tooth to be engaged should be in such a position that it would not engage readily, the position of the tooth could be changed by giving the pedal a slight kick, the jar would compress or tension the spring which controls the position of the second section, and when the spring returned to its normal position it would cause the sprocket to revolve slightly and come to rest in a different position.

The operation of the device will be apparent from the foregoing. When the operator desires to start the machine he first retards the spark lever to the proper position for cranking the engine, and, by so doing, he withdraws the latch 14 from in front of the pedal, thus permitting the said pedal to be moved. He then presses the pedal 2 to the extreme end of its travel, thus bringing the rack into engagement with the sprocket wheel 6, causing the sprocket wheel to make about one-half a revolution. The pawl 7 on the sprocket wheel engages the ratchet 4, causing the crank shaft 5 to revolve in unison with the sprocket wheel 6. The engine then starts and the pedal is allowed to return to its former position, when the rack will be disengaged from the sprocket, allowing the sprocket to revolve with the engine.

Having now fully described my invention, what I claim as new and desire to secure by Letters-Patent, is:—

1. An automobile starter, comprising a rack provided with teeth at one end, a pedal for moving the rack in one direction, means for returning the rack, a latch for locking the pedal and a spark lever connected with the latch for releasing the same.

2. An automobile starter comprising in combination with the crank shaft of the engine, of a pedal, a rack, a connection between the pedal and the rack, a sprocket wheel, a ratchet wheel comprising a section rigid with the crank shaft, and a section journaled thereon, a spring normally acting to hold the disconnected section in advance of the rigid section, a pawl on the sprocket for engaging the ratchet, and a spring for returning the rack.

3. In a device of the class described, the combination with the spark lever and the crank shaft of the engine, of a sprocket wheel thereon, a rack meshing with the sprocket wheel, a pedal for moving the rack, a lock for the pedal, and a connection between the spark lever and the latch for releasing the same when the spark lever is in retarded position.

4. In a device of the class described, the combination with the spark lever and the crank shaft of the engine, of a sprocket wheel thereon, a rack meshing with the sprocket wheel, a pedal for moving the rack, a lock for the pedal and a flexible connection between the spark lever and the latch for releasing the same when the spark lever is in retarded position.

5. In a device of the class described, the combination with the crank shaft of the engine, of a sprocket wheel thereon, a rack comprising parallel bars, rollers for engagement by the teeth of the sprockets journaled between the bars, said rollers being arranged in a series, at one end of the rack for the purpose set forth, and means for moving the rack.

6. In a device of the class described, the combination with the crank shaft, of a ratchet wheel comprising a section secured thereto, and a section journaled thereon, and a yielding means for retaining the last named section in advance of the first named section.

In testimony whereof I affix my signature in presence of two witnesses.

CHARLES ALVAH SMITH.

Witnesses:
FRED C. ADAMS,
L. G. TASKER.